(No Model.)  F. A. HITE.  2 Sheets—Sheet 1.
EMERGENCY BRAKE AND FENDER COMBINED.
No. 594,693.  Patented Nov. 30, 1897.

Witnesses  
J. B. Appleman,  
A. M. Wilson

Inventor  
Francis A. Hite.  
By Henry C. Evert.  
Attorney

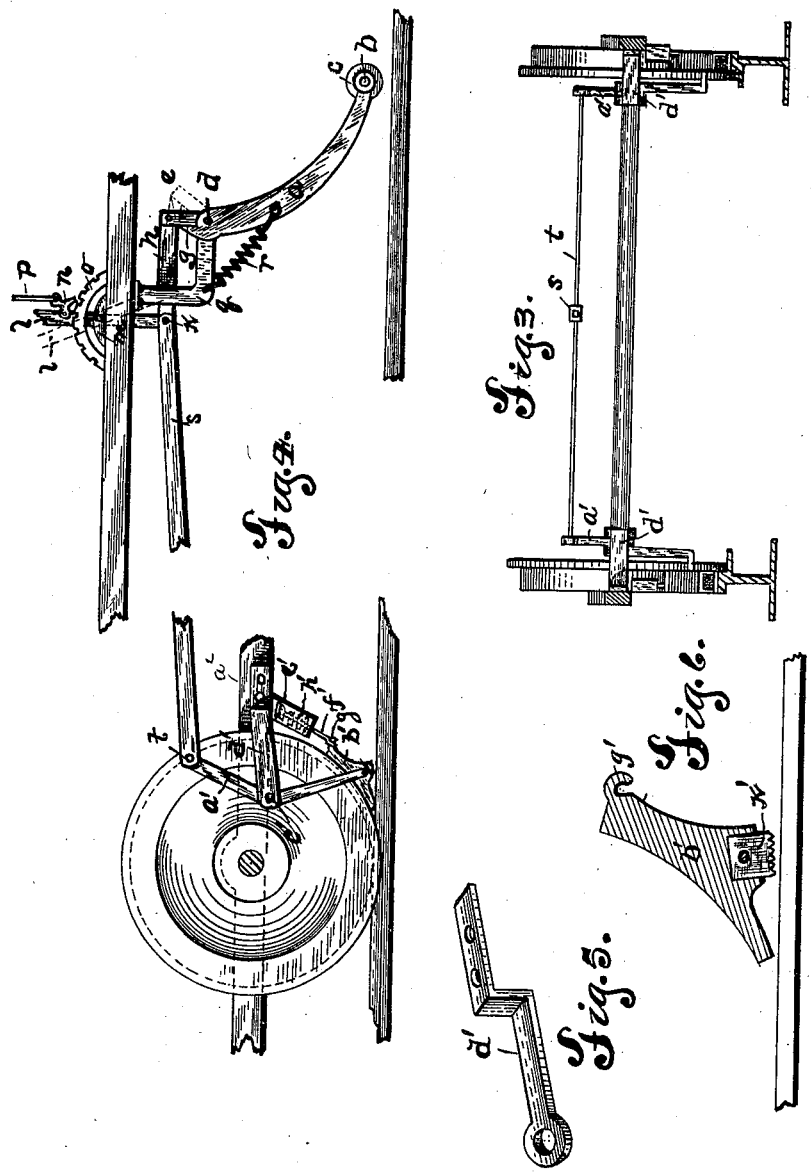

UNITED STATES PATENT OFFICE.

FRANCIS A. HITE, OF PITTSBURG, PENNSYLVANIA.

EMERGENCY BRAKE AND FENDER COMBINED.

SPECIFICATION forming part of Letters Patent No. 594,693, dated November 30, 1897.

Application filed February 3, 1897. Serial No. 621,781. (No model.)

*To all whom it may concern:*

Be it known that I, FRANCIS A. HITE, a citizen of the United States of America, residing at Pittsburg, in the county of Allegheny and State of Pennsylvania, have invented certain new and useful Improvements in an Emergency Brake and Fender Combined, of which the following is a specification, reference being had therein to the accompanying drawings.

This invention relates to certain new and useful improvements in car fenders and brakes, and relates more particularly to that class of brakes known as "emergency-brakes," having for their object to check the speed of the car or other vehicle suddenly and to be used only when the ordinary brake with which the car or vehicle is equipped is not capable of performing the required function.

The invention aims to construct a brake of this nature which will operate, in conjunction therewith, a fender which will be automatically lowered from its normal position to one in close proximity to the rails and prevent any object from passing underneath the body of the car and coming in contact with the wheels or other mechanism thereof.

The invention has a further object to construct a brake that will engage the wheels of the truck and the track-rail at the same time, and thus secure a much greater efficiency of the braking power than is obtained where the brake-shoe is applied to the wheel alone; furthermore, to provide such a brake that when applied to a street-car or other like vehicle it may be operated from either end of the same and may be placed thereon so that the same will not in any manner interfere with the working of the ordinary brakes or motive power.

A still further object of my invention is to construct a brake and fender combination that will be extremely simple in its construction, strong, durable, effectual in its operation, and comparatively inexpensive to manufacture.

With the above and other objects in view the invention finally consists in the novel construction, combination, and arrangement of parts to be herein more specifically described, and particularly pointed out in the claims.

Describing the invention in detail, reference is had to the accompanying drawings, forming a part of this specification, wherein like letters of reference indicate similar parts throughout the several views, in which—

Figure 1:
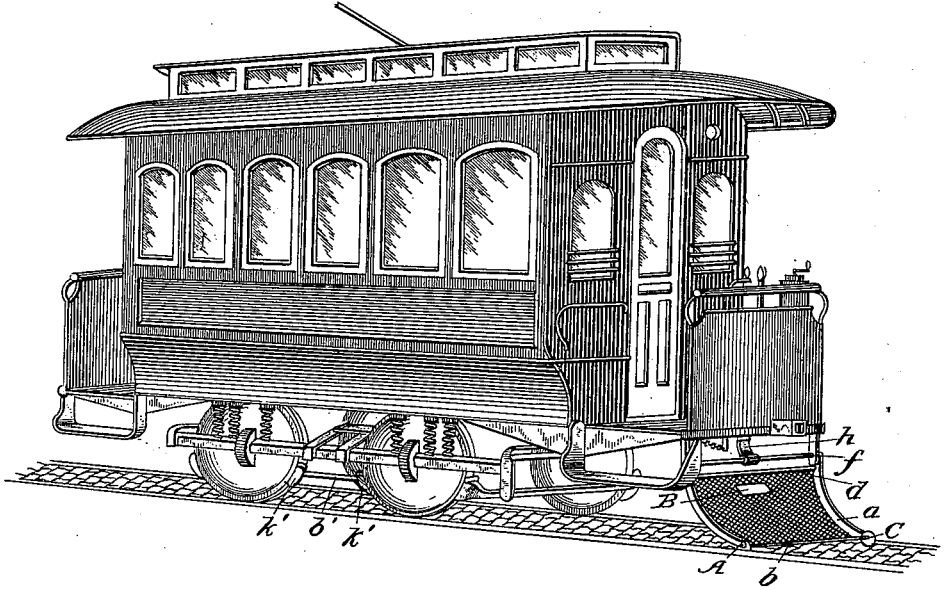
Figure 2:
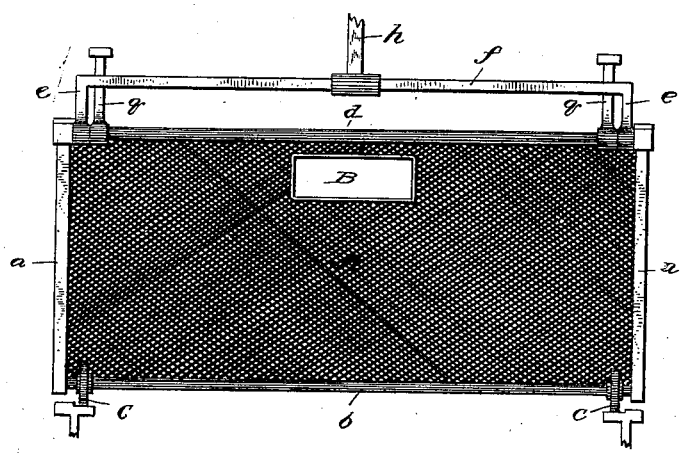

Figure 1 is a perspective view of a street-car, showing my combination emergency brake and fender applied in position. Fig. 2 is a front elevation of the fender. Fig. 3 is a front view of a portion of the brake and truck mechanism. Fig. 4 is a side elevation of the brake and fender, the front wheel being removed to better show the operation of the several parts. Fig. 5 is a perspective view of one of the beams attached to the truck-frame for supporting the brake mechanism. Fig. 6 is a vertical sectional view of the brake-shoe, showing removable bit.

Referring now to the drawings by reference-letters, $a\ a$ represent the grooved side braces of the fender, which are connected at their lower end by a rod or axle $b$, carrying wheels or rollers $c\ c$, adapted to engage the rails when the fender is in the lowered position and the brake-shoes are in engagement with the wheels and rails. These side braces are connected at their upper ends by a rod $d$, to which is attached the crank ends $e\ e$ of the fender-operating rod $f$, said side braces $a$ being formed at their upper ends with projections $g$, which engage on these crank ends $e$ of the operating-rod $f$ and serve to hold the fender in the raised position. Centrally secured to this rod $f$ is an arm $h$, having its opposite end attached to a rod $k$, extending transversely of the car and having attached thereto the operating-lever L, which is pivotally supported in a bushing $m$ or other suitable means and preferably arranged at the side of the car. This operating-lever $l$ carries a pawl $n$, adapted to engage a rack-bar $o$, said pawl being connected to a rod $p$, extending upward to the grip portion of the lever, the operation of this portion of the construction being well known.

Secured to the car-body and to the rod $d$ are applied crank-arms $q\ q$, to which are attached springs $r\ r$, having their other ends secured to the side braces $a$ of the fender, and attached to the rod $k$ is the pull-rod $s$, having its rear end secured to the rod $t$, supported in the upper ends of levers $a'$, the lower ends of said levers being attached to the brake-shoes $b'$, said levers being supported by the rod $c'$, passing through the same and through the braces $d'$, attached to the frame $a^2$ of the truck. Also secured to this frame are casings $e'$, which receive the rod $f'$, engaging the hook $g'$ on the upper end of the brake-shoe, said rod being provided within the casing with a spiral spring $h'$, encircling the said rod between its upper end and the base of the casing, which serves to hold the brake-shoes normally out of engagement. A removable bit or spur $k'$ is secured in this brake-shoe and is provided with a corrugated or otherwise roughened engaging face for the purpose of engaging the rail more firmly when the same comes in contact therewith. A suitable netting A is provided for the fender, and this netting is provided with a suitable opening or aperture B to permit the coupling of the different cars together. This construction of netting may be of any form desired.

The rests $a^3$ are the longitudinal bars forming a part of the truck and carrying the braces $d'$.

My improved emergency brake and fender is applied to be operated from either end of the car, the brake-lever on the one end of the car operating the fender on the same end and the brake-shoes on the rear wheels from this end. We will therefore assume that the parts have all been secured in their respective positions and the operating-lever $l$ on one end of the car is moved to the position shown in dotted lines in Fig. 4, this operation forcing the arm $h$ outwardly and moving the rod $f$ and its crank ends $e$ forwardly, thus permitting the springs $r\ r$ to pull the fender down into contact with the rails, and during this operation the operating-lever has also moved the pull-rod $s$ forwardly, causing the same to operate on lever $a'$ and bring the brake-shoe $b'$ in contact with the wheel and at the same time forcing the bit or spur $k'$ into contact with the rail, in which position the parts may be locked by the engaging pawl $n$ in the rack $o$. When this pawl is released from its engagement with the rack $o$ and the operating-lever is pushed forward, the reversed operation will take place, the springs $h'$ within the casing $e'$ assisting in releasing the brake-shoe and the crank ends $e$ of the rod $f$ returning the fender to its former position by reason of their engagement with the projections $g\ g$ of the side braces.

By this construction of the fender and brake it will be observed that the fender is held normally out of engagement with the track except when desired for use, and when this happens it is also always desired to check the speed of the car as rapidly as possible, which may be accomplished much more rapidly by reason of my improved brake engaging both the wheel and the rail than is accomplished where the brake-shoe engages the wheel alone. Furthermore, the fender when brought into contact with the rails is held in this position firmly by the brake and prevented from rising when it comes in contact with a person or object, as is often the case.

Having fully described my invention, what I claim as new, and desire to secure by Letters Patent, is—

1. In an emergency brake and fender, a fender consisting of side braces connected by an axle at their lower end, rollers secured on said axle, a rod connecting said braces at the upper end, a rod provided with crank-arms engaging the aforesaid rod, an arm connecting the latter rod to the operating-lever, brake-shoes supported by levers pivotally secured to braces carried by the frame, a pull-rod pivotally secured to one arm of the levers and the operating-lever and a brake-shoe provided with engaging bits or spurs adapted to come in contact with the rail when the brake-shoes are forced against the wheel, substantially as shown and described.

2. In an emergency brake and fender, a fender consisting of braces connected by an axle at their lower end, rollers secured on said axle, crank-arms secured to the platform of the car, and carrying springs, the opposite ends of which are secured to the side braces of the fender, an operating-lever having a link pivotally secured to the lower end of said operating-lever and extending at right angles thereto and engaging the crank-operating rod carried by the fender, a link, one end of said link being pivoted to the operating-lever, and the opposite end engaging an elbow-shaped lever operating the brake-shoe, substantially as shown and described.

In testimony whereof I affix my signature in presence of two witnesses.

FRANCIS A. HITE.

Witnesses:
JOHN NOLAND,
GEO. B. PARKER.